US012802157B2

(12) United States Patent
He et al.

(10) Patent No.: US 12,802,157 B2
(45) Date of Patent: Nov. 17, 2026

(54) METHODS AND CAMERA MONITOR SYSTEMS INCLUDING CAMERA PERSPECTIVE TRANSFORMATION FEATURES

(71) Applicant: Stoneridge Electronics AB, Solna (SE)

(72) Inventors: Yu He, Dearborn Heights, MI (US); Liang Ma, Rochester, MI (US); Utkarsh Sharma, Farmington Hills, MI (US)

(73) Assignee: Stoneridge Electronics AB, Solna (SE)

( * ) Notice: Subject to any disclaimer, the term of this patent is extended or adjusted under 35 U.S.C. 154(b) by 209 days.

(21) Appl. No.: 18/926,850

(22) Filed: Oct. 25, 2024

(65) Prior Publication Data

US 2026/0120232 A1 Apr. 30, 2026

(51) Int. Cl.
*G06T 3/20* (2006.01)
*B60R 1/25* (2022.01)
(Continued)

(52) U.S. Cl.
CPC .................. *G06T 3/20* (2013.01); *B60R 1/25* (2022.01); *B60R 1/26* (2022.01); *G06T 7/74* (2017.01);
(Continued)

(58) Field of Classification Search
CPC ... G06T 3/20; G06T 7/74; G06T 2207/30252; G06V 10/243; G06V 20/56; B60R 1/25; B60R 1/26; B60R 2300/105
See application file for complete search history.

(56) References Cited

U.S. PATENT DOCUMENTS 7,324,706 B2 1/2008 Bassi
8,768,094 B2 7/2014 Bassi et al.
(Continued)

FOREIGN PATENT DOCUMENTS

CA 2147333 10/1996
DE 102014006150 10/2015
(Continued)

OTHER PUBLICATIONS

Kim et al., "Real-time lens distortion algorithm on an edge device with GPU", IEEE, vol. 10, pp. 41748-41757, Apr. 14, 2022.
(Continued)

*Primary Examiner* — David F Dunphy
(74) *Attorney, Agent, or Firm* — Carlson, Gaskey & Olds, P.C.

(57) ABSTRACT

A method for a camera monitor system (CMS) includes utilizing a camera mounted to tractor of a commercial vehicle to obtain an image of an external environment of a trailer of the commercial vehicle; determining a homography matrix for providing a perspective transformation of the image according to a target panning magnitude for the commercial vehicle and according to a target orientation adjustment for the camera; and utilizing the homography matrix to perform the perspective transformation and thereby obtain a modified version of the image. The perspective transformation simulates adjustment of at least one of a pitch, yaw, and roll of the camera. The method also includes displaying the modified version of the image on an electronic display. A CMS is also disclosed.

20 Claims, 13 Drawing Sheets

(51) Int. Cl.

| | |
|---|---|
| ***B60R 1/26*** | (2022.01) |
| ***G06T 7/73*** | (2017.01) |
| ***G06V 10/24*** | (2022.01) |
| ***G06V 20/56*** | (2022.01) |

(52) U.S. Cl.

CPC ............ *G06V 10/243* (2022.01); *G06V 20/56* (2022.01); *B60R 2300/105* (2013.01); *G06T 2207/30252* (2013.01)

(56) References Cited

U.S. PATENT DOCUMENTS

| | | | | |
|---|---|---|---|---|
| 10,315,571 | B2 | 6/2019 | Moulton et al. | |
| 10,928,508 | B2 | 2/2021 | Swaminathan | |
| 11,263,723 | B2 | 3/2022 | Chang | |
| 11,613,207 | B2 | 3/2023 | Berne | |
| 11,752,943 | B1 | 9/2023 | Ma et al. | |
| 2008/0231710 | A1 | 9/2008 | Asari et al. | |
| 2010/0165104 | A1 | 7/2010 | Fujita et al. | |
| 2017/0032555 | A1* | 2/2017 | Gingawa ................ | H04N 7/147 |
| 2017/0230558 | A1 | 8/2017 | Morales et al. | |
| 2017/0361771 | A1 | 12/2017 | Moulton et al. | |
| 2018/0118199 | A1* | 5/2018 | Chaney, Jr. ........... | B60W 50/12 |
| 2020/0410634 | A1 | 12/2020 | Yan et al. | |
| 2023/0222916 | A1 | 7/2023 | Yan et al. | |
| 2023/0368425 | A1* | 11/2023 | Gilad ........................ | G06T 3/02 |
| 2024/0042933 | A1 | 2/2024 | Baur et al. | |

FOREIGN PATENT DOCUMENTS

| | | |
|---|---|---|
| EP | 3076365 | 10/2016 |
| EP | 3260329 | 12/2017 |
| GB | 2544158 | 5/2017 |

OTHER PUBLICATIONS

Calore et al., "Accelerometer based horizon and keystone perspective correction", 2013 IEEE International Instrumentation and Measurement Technology Conference, pp. 205-209, May 13, 2023.

International Search Report and Written Opinion for International Patent Application No. PCT/EP2024/080301 dated May 12, 2025.

* cited by examiner

METHODS AND CAMERA MONITOR SYSTEMS INCLUDING CAMERA PERSPECTIVE TRANSFORMATION FEATURES

TECHNICAL FIELD

This disclosure relates to a camera monitor system (CMS), and more particularly to methods and camera monitor systems that include camera perspective transformation features.

BACKGROUND

Vehicle camera systems for mirror replacement or for supplementing mirror views are utilized in commercial vehicles to enhance the ability of a vehicle operator to see a surrounding environment of the commercial vehicle. These systems are known as "camera monitor systems" (CMS), and they utilize one or more cameras mounted to a commercial vehicle (typical a tractor of the commercial vehicle) to provide an enhanced field of view to a vehicle operator of an area surrounding a trailer of the commercial vehicle. CMS may also include cameras in locations not typically associated with a mirror, such as a rear camera (e.g., a trailer camera) that records images of an area behind a vehicle, a camera that records an area in front of a vehicle, etc.

During turns and/or reversing maneuvers, when the trailer may significantly obstruct the driver's view of the vehicle's surroundings, it is known to provide panning. One known panning technique involves rotating a camera. Another known panning technique involves adjusting the crop of a larger wide angle image to control what is shown to the driver from that image. When the latter technique is used, significant image warping may be exhibited, particularly towards the outer edge of the wide angle image.

SUMMARY

A method for a camera monitor system (CMS) according to an example embodiment of the present disclosure includes utilizing a camera mounted to tractor of a commercial vehicle to obtain an image of an external environment of a trailer of the commercial vehicle; determining a homography matrix for providing a perspective transformation of the image according to a target panning magnitude for the commercial vehicle and according to a target orientation adjustment for the camera; and utilizing the homography matrix to perform the perspective transformation and thereby obtain a modified version of the image. The perspective transformation simulates adjustment of at least one of a pitch, yaw, and roll of the camera. The method also includes displaying the modified version of the image on an electronic display.

In a further embodiment of the foregoing embodiment, the method includes determining a location of the camera relative to a reference point associated with the commercial vehicle and determining the yaw, pitch, and roll of the camera relative to a frame of reference associated with the commercial vehicle. The perspective transformation simulates reduction of at least one of the yaw, pitch, and roll of the camera relative to the frame of reference.

In a further embodiment of any of the foregoing embodiments, as the target panning magnitude increases, the determining the homography matrix is performed to increase a magnitude of the simulated adjustment of the at least one of the yaw, pitch, and roll.

In a further embodiment of any of the foregoing embodiments, the perspective transformation simulates adjustment of the pitch of the camera.

In a further embodiment of any of the foregoing embodiments, the perspective transformation simulates adjustment of the yaw of the camera, and includes adding the target panning magnitude to a yaw axis of the camera.

In a further embodiment of any of the foregoing embodiments, the perspective transformation simulates adjustment of the roll of the camera.

In a further embodiment of any of the foregoing embodiments, the perspective transformation simulates adjustment of the pitch, yaw, and roll of the camera.

In a further embodiment of any of the foregoing embodiments, the determining the homography matrix includes dynamically determining the homography matrix.

In a further embodiment of any of the foregoing embodiments, the determining the homography matrix includes selecting the homography matrix from a set of predefined homography matrices.

In a further embodiment of any of the foregoing embodiments, the method includes determining the target panning magnitude based on a trailer angle of the trailer, and based on one or more parameters of the commercial vehicle.

A CMS according to an example embodiment of the present disclosure includes a camera mounted to tractor of a commercial vehicle and configured to obtain an image of an external environment of a trailer of the commercial vehicle; and processing circuitry operatively connected to memory. The processing circuitry is configured to: determine a homography matrix for providing a perspective transformation of the image according to a target panning magnitude for the commercial vehicle and according to a target orientation adjustment for the camera; utilize the homography matrix to perform the perspective transformation and thereby obtain a modified version of the image; and display the modified version of the image on an electronic display. The perspective transformation simulates adjustment of at least one of a pitch, yaw, and roll of the camera.

In a further embodiment of the foregoing embodiment, the processing circuitry is configured to determine a location of the camera relative to a reference point associated with the commercial vehicle and determine the yaw, pitch, and roll of the camera relative to a frame of reference associated with the commercial vehicle. The perspective transformation simulates reduction of at least one of the yaw, pitch, and roll of the camera relative to the frame of reference.

In a further embodiment of any of the foregoing embodiments, the processing circuitry is configured to, as the target panning magnitude increases, determine the homography matrix to increase a magnitude of the simulated adjustment of the at least one of the yaw, pitch, and roll.

In a further embodiment of any of the foregoing embodiments, the perspective transformation simulates adjustment of the pitch of the camera.

In a further embodiment of any of the foregoing embodiments, the perspective transformation simulates adjustment of the yaw of the camera, and includes addition of the target panning magnitude to a yaw axis of the camera.

In a further embodiment of any of the foregoing embodiments, the perspective transformation simulates adjustment of the roll of the camera.

In a further embodiment of any of the foregoing embodiments, the perspective transformation simulates adjustment of the pitch, yaw, and roll of the camera.

In a further embodiment of any of the foregoing embodiments, the processing circuitry is configured to dynamically determine the homography matrix.

In a further embodiment of any of the foregoing embodiments, the processing circuitry is configured to select the homography matrix from a set of predefined homography matrices.

In a further embodiment of any of the foregoing embodiments, the processing circuitry is configured to determine the target panning magnitude based on a trailer angle of the trailer, and based on one or more parameters of the commercial vehicle.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The disclosure can be further understood by reference to the following detailed description when considered in connection with the accompanying drawings wherein.

DETAILED DESCRIPTION

A schematic view of a commercial vehicle 10 is illustrated in FIGS. 1A-D, 2, and 5-6. The vehicle 10 includes a vehicle cab or "tractor" 12 for pulling a trailer 14. Although the vehicle 10 is depicted as a commercial truck in this disclosure, it is understood that other types of vehicles may be used, and it should be understood that other configurations may be utilized for the vehicle cab 12 and/or trailer 14 (e.g., different types or quantities of trailers).

Figure 1A:
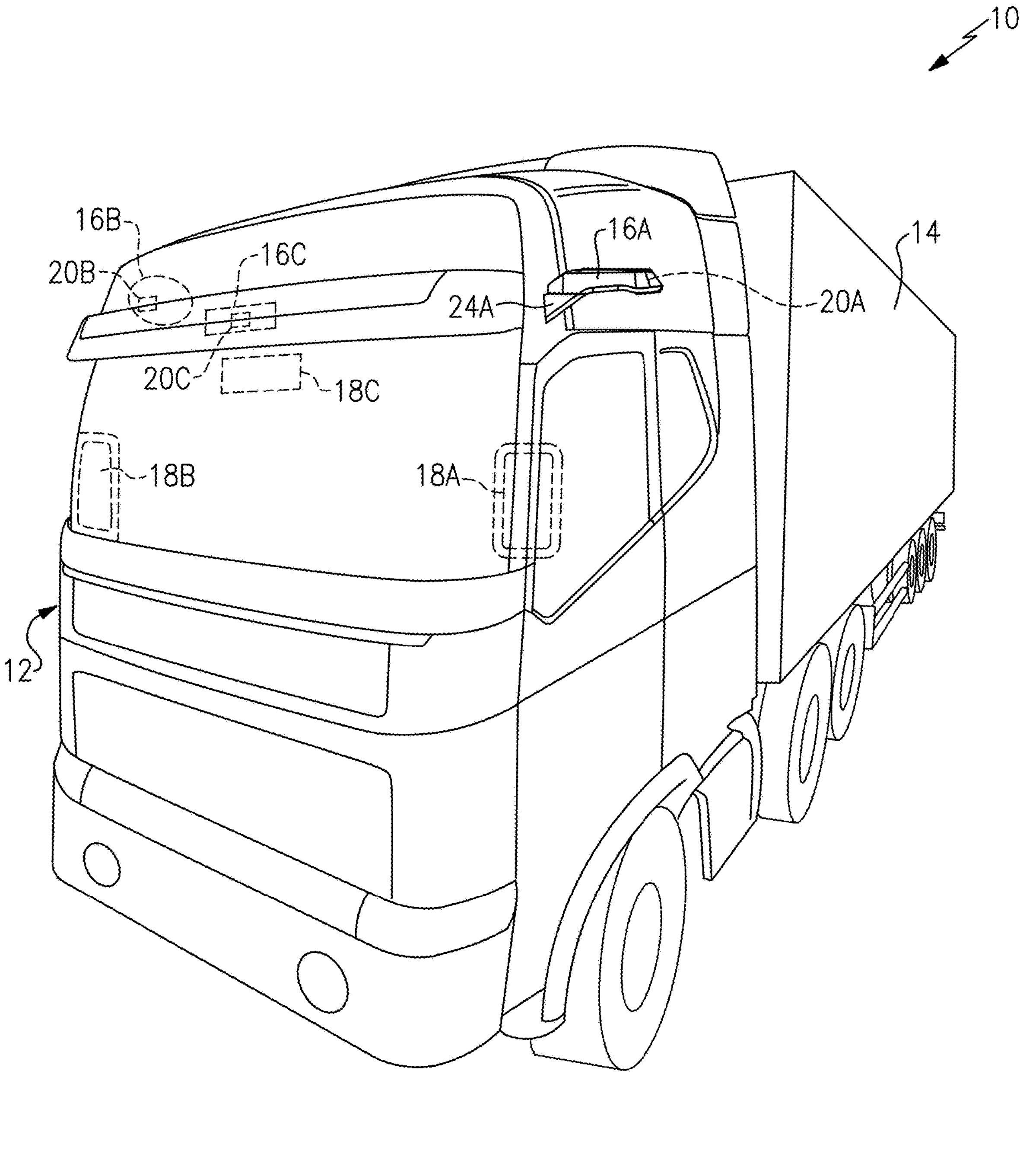
FIG. 1A is a schematic front perspective view of an example commercial vehicle with a camera mirror system (CMS) used to provide at least Class II and Class IV views.
Figure 1B:
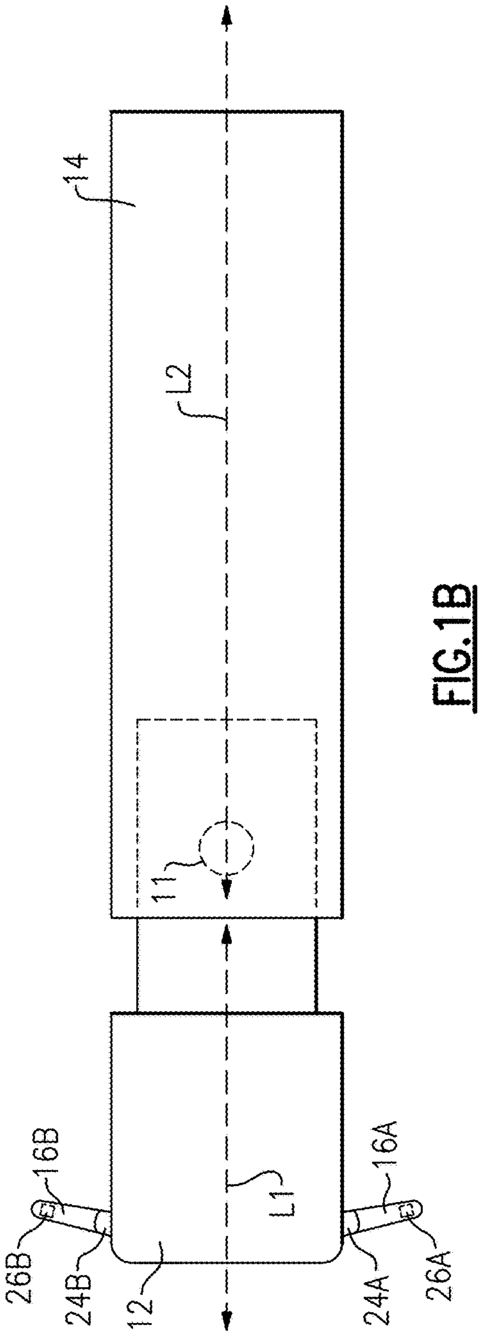
FIG. 1B is a schematic birds-eye view of the commercial vehicle of FIG. 1 with a trailer angle of zero.
Figure 1C:
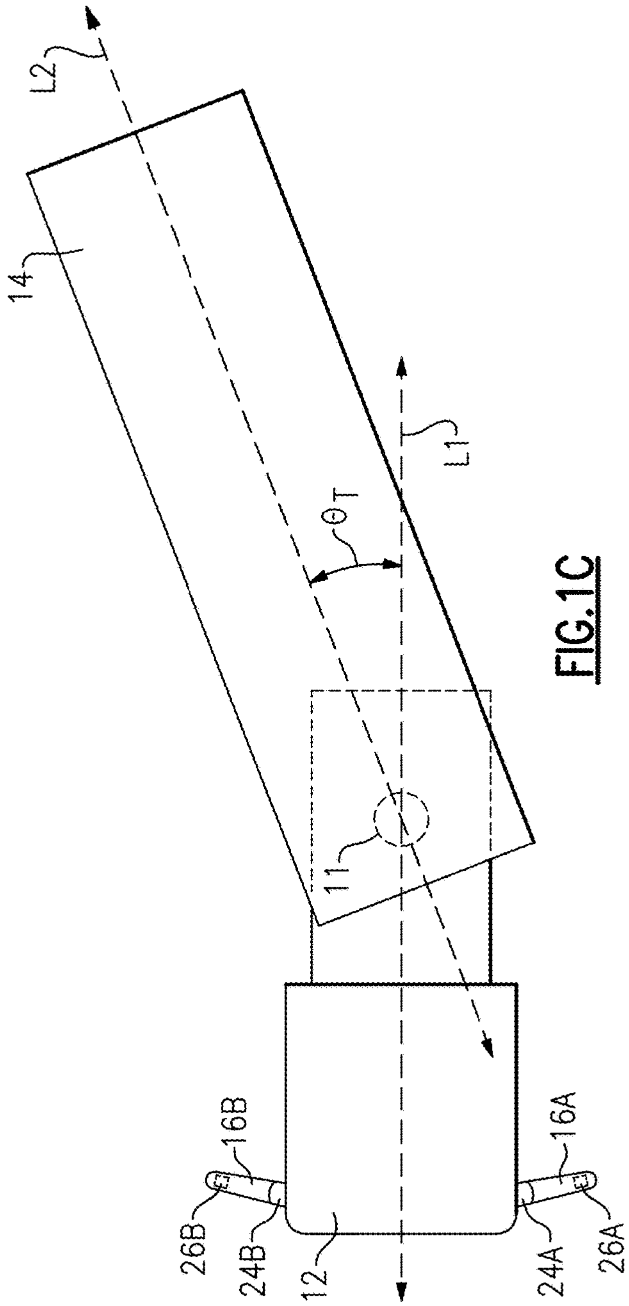
FIG. 1C is a schematic birds-eye view of the commercial vehicle of FIG. 1 with a non-zero trailer angle.

As shown in FIG. 1B-1C, a hitch 11 mounts the trailer 14 to the tractor 12, and allows the trailer 14 to pivot with respect to the tractor 12 during turns. The tractor 12 has a central longitudinal axis L1, and the trailer 14 has a central longitudinal axis L2. As shown in FIG. 1B, when the tractor 12 is not turning, the axes L1, L2 are parallel or co-axial, and there is no angle between the axis L1, L2. As shown in FIG. 1C, when the tractor 12 is turning, an angle $\theta_T$ is formed between the axes L1, L2. The angle between the axes L1, L2, which is approximately 20° in FIG. 1C, will be referred to a "trailer angle" herein.

Figure 1D:
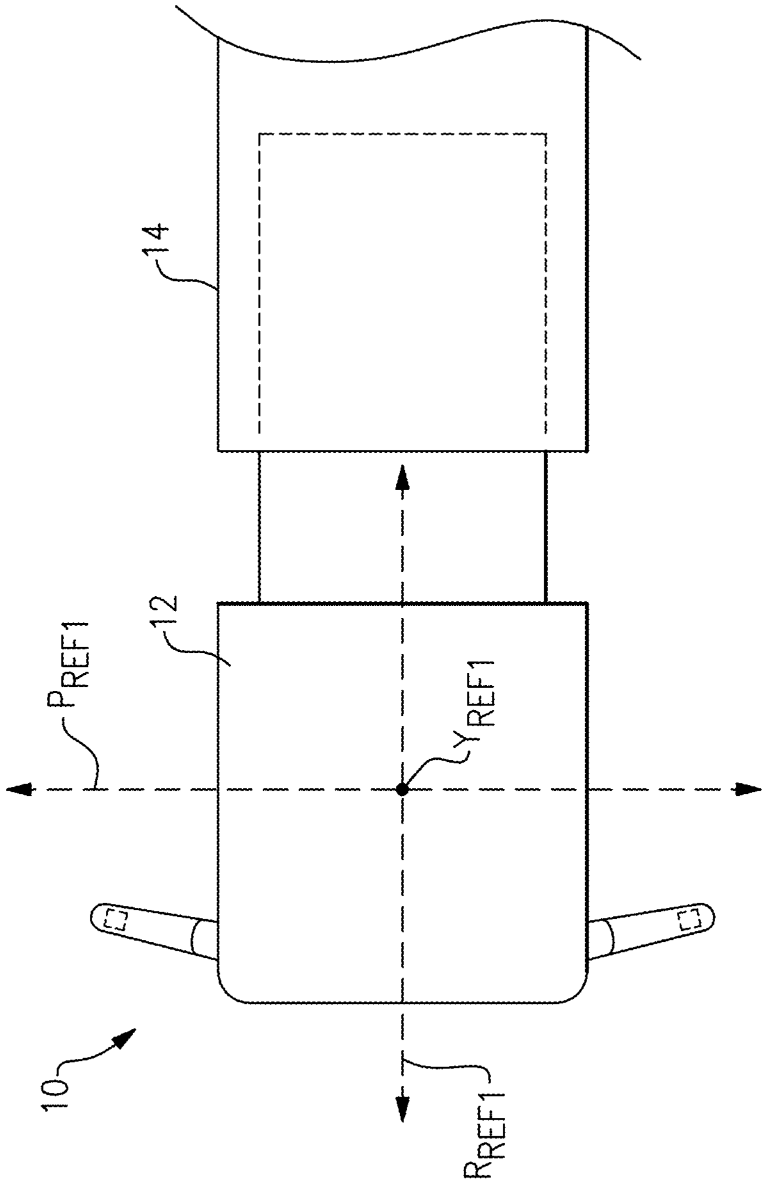
FIG. 1D provides a schematic birds-eye view of the commercial vehicle of FIG. 1 and illustrates a frame of reference of the commercial vehicle.

FIG. 1D provides a schematic birds-eye view of the commercial vehicle 10. The vehicle 10 has a frame of reference corresponding to a pitch axis $P_{REF1}$ of the tractor 12, a yaw axis $Y_{REF1}$ of the tractor 12, and a roll axis $R_{REF1}$ of the tractor 12. In one or more embodiments, the roll axis $R_{REF1}$ is coaxial with or parallel to the longitudinal axis L1 of FIG. 1B, the pitch axis $P_{REF1}$ extends laterally across the tractor 12 and is perpendicular to the roll axis $R_{REF1}$, and the yaw axis $Y_{REF1}$ is perpendicular to each of the axes $P_{REF1}$ and $P_{REF1}$ and is perpendicular to a ground surface beneath the vehicle.

Figure 2:
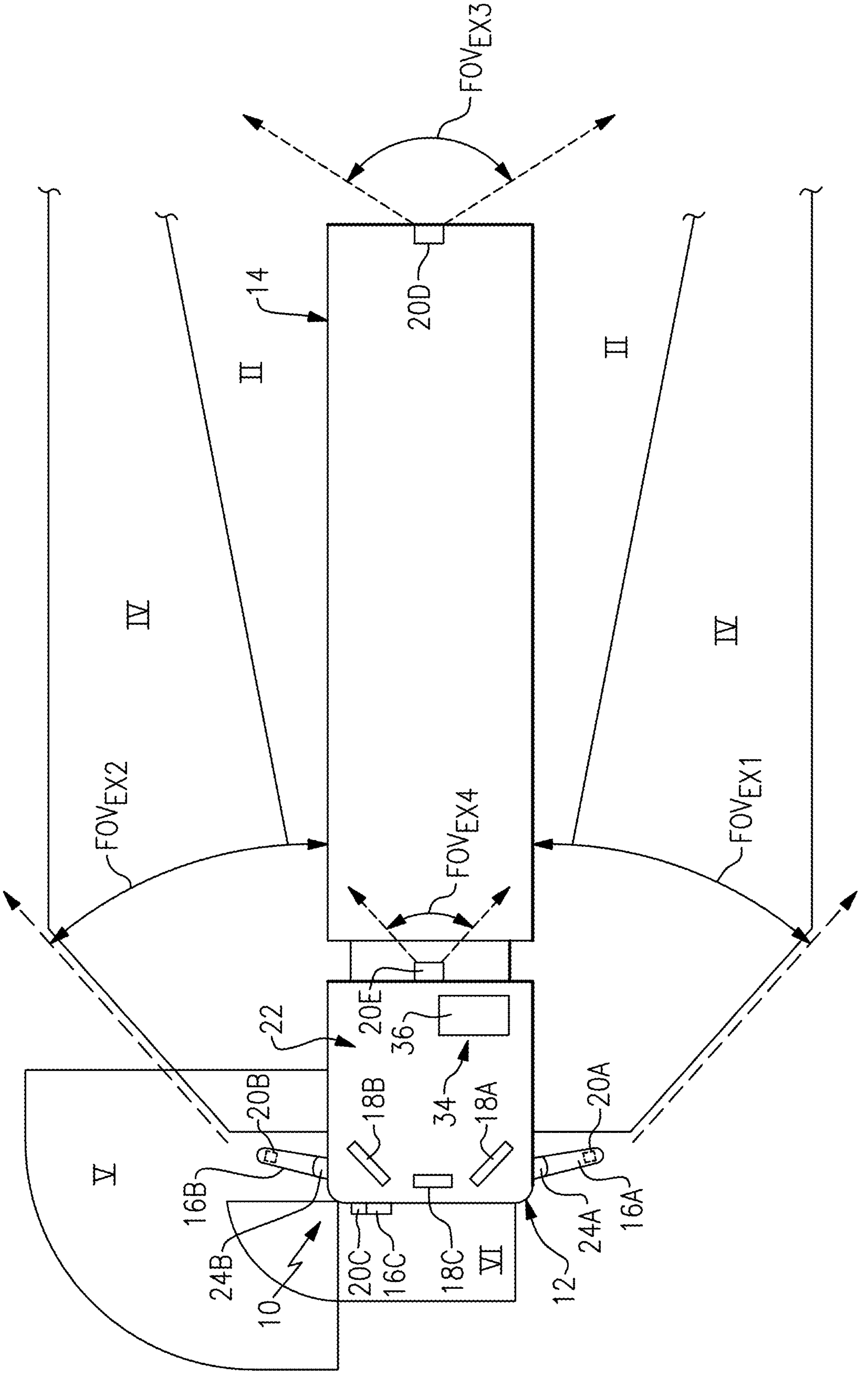
FIG. 2 is a schematic birds-eye view of the commercial vehicle of FIG. 1.

Referring now to FIGS. 1A and 2, camera arms 16A-B each include a respective base 24A-B that is secured to, for example, the tractor 12. The pivoting camera arms 16A-B are supported by the respective bases 24A-B and may articulate relative thereto. At least one rearward facing camera 20A-B is arranged respectively on or within the camera arms 16A-B. The exterior cameras 20A-B respectively provide an exterior field of view $FOV_{EX1}$, $FOV_{EX2}$ that each include at least one of Class II and Class IV views (see FIG. 2), which are legally prescribed views in the commercial trucking industry. Although rotatable camera arms 16 are depicted, it is understood that this is a non-limiting example and that non-rotatable camera arms may be used.

The Class II view on a given side of the commercial vehicle 10 is a subset of the class IV view of the same side of the commercial vehicle 10. Multiple cameras also may be used in each camera arm 16A-B to provide these views, if desired. Class II (narrow) and Class IV (wide angle) views are defined in European R46 legislation, for example, and the United States and other countries have similar drive visibility requirements for commercial trucks. Any reference to a "Class" view is not intended to be limiting, but is intended as an example of the type of view provided to a display from a particular camera.

Each camera arm 16A-16B may also provide a housing that encloses electronics, e.g., a controller, that are configured to provide various features of the CMS 15. The camera arms 16A-B may be mounted either at a roof-mount location over the cab door (as shown), or on a door-mounted bracket or station, for example.

If video of Class V and/or Class VI views is also desired, a camera housing 16C and camera 20C may be arranged at or near the front of the commercial vehicle 10 to provide those views (FIG. 2).

A backup camera 20D may be provided which provides a field of view $FOV_{EX3}$. The backup camera 20D may be mounted at a top/centerline of the trailer, at a bumper/bed level of the trailer, or at a top-corner of the back of the trailer, for example. Alternatively, or in addition to the rear trailer camera, a "fifth wheel camera" 20E may be provided that is mounted to a rear of the tractor 12 and that provides a field of view $FOV_{EX4}$. The fifth wheel camera 20E may be mounted anywhere between the lateral plane of the fifth wheel fixture and the top/roof edge of the tractor, for example.

Figure 3A:
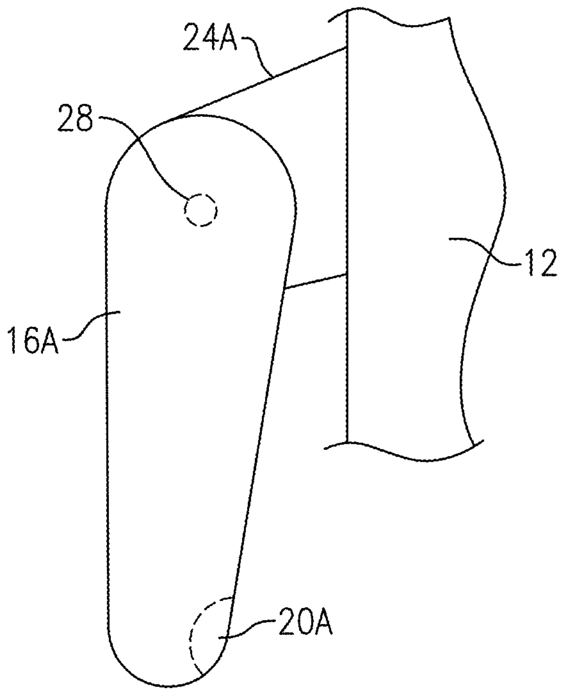
FIG. 3A is a schematic view of a camera arm in a retracted position.
Figure 3B:
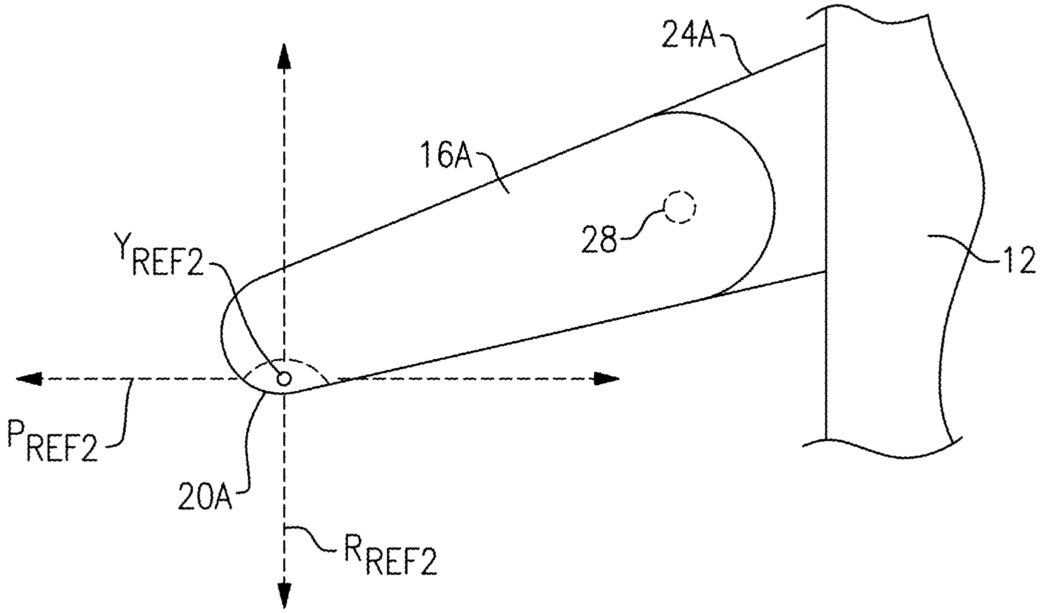
FIG. 3B is a schematic view of a camera arm in an extended position.

FIG. 3A schematically illustrates an example of camera arm 16*a* in a retracted position, and FIG. 3B schematically illustrates the camera arm 16A in an extended position. Each camera arm 16A-B includes at least one rearward facing camera 20. Each camera 20 is connected to its respective base 24 through a respective linkage 28A-B (e.g., a ball joint), and the camera arms 16A-B are configured to rotate about their respective linkage 28A-B between their respective retracted position (shown for camera arm 16A in FIG. 3A) and extended position (shown for camera arm 16A in FIG. 3B). In particular, each camera arm 16 is configured to extend from the retracted position to the extended position through an extension process, and is configured to retract from the extended position to the retracted position through a retraction process.

Figure 4:
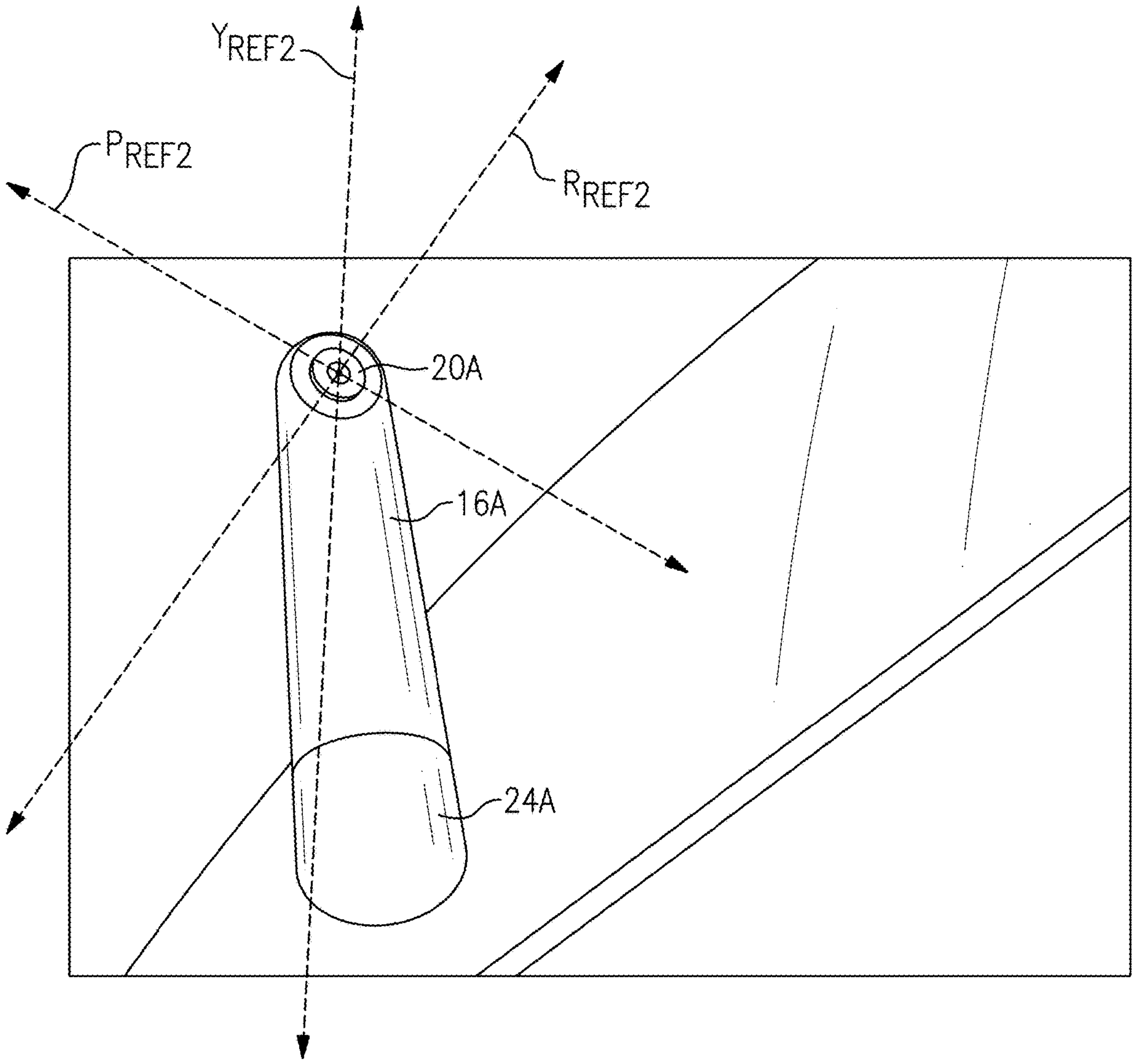
FIG. 4 is a perspective view of the camera arm in the extended position.

As shown in FIG. 3B and FIG. 4, the camera 20A has a pitch axis $P_{REF2}$, yaw axis $Y_{REF2}$, and roll axis $R_{REF2}$ that have a relationship with respect to the frame of reference of FIG. 1D corresponding to axes $P_{REF1}$, $Y_{REF1}$ and $P_{REF1}$. In one or more embodiments, axes $P_{REF1}$ and $P_{REF2}$ are parallel, axes $Y_{REF1}$ and $Y_{REF2}$ are parallel, and axes $R_{REF1}$ and $R_{REF2}$ are parallel.

The camera 20A has a pitch $P_{CAM}$ about pitch axis $P_{REF2}$, a yaw $Y_{CAM}$ about yaw axis $Y_{REF2}$, and a roll $R_{CAM}$ about roll axis $R_{REF2}$. The magnitude of the pitch $P_{CAM}$, yaw $Y_{CAM}$, and roll $R_{CAM}$ is determined relative to a frame of reference associated with the commercial vehicle 10 (e.g., relative to reference axes $P_{REF2}$, $Y_{REF2}$, and $R_{REF2}$). The camera 20A also has a position with (x, y, z) coordinates relative to a reference point (e.g., an intersection of axes $P_{REF1}$, $Y_{REF1}$, and $P_{REF1}$).

To minimize image warping, it is desirable for the pitch $P_{CAM}$, yaw $Y_{CAM}$, and roll $R_{CAM}$ to be zero. However, this may not be the case. As a result of non-zero pitch, yaw, and/or roll due to the skewed orientation of the camera 20A provided by the non-zero pitch, yaw, and/or roll of the camera 20A, images recorded by the camera 20A may exhibit more warping than necessary.

Figure 5:
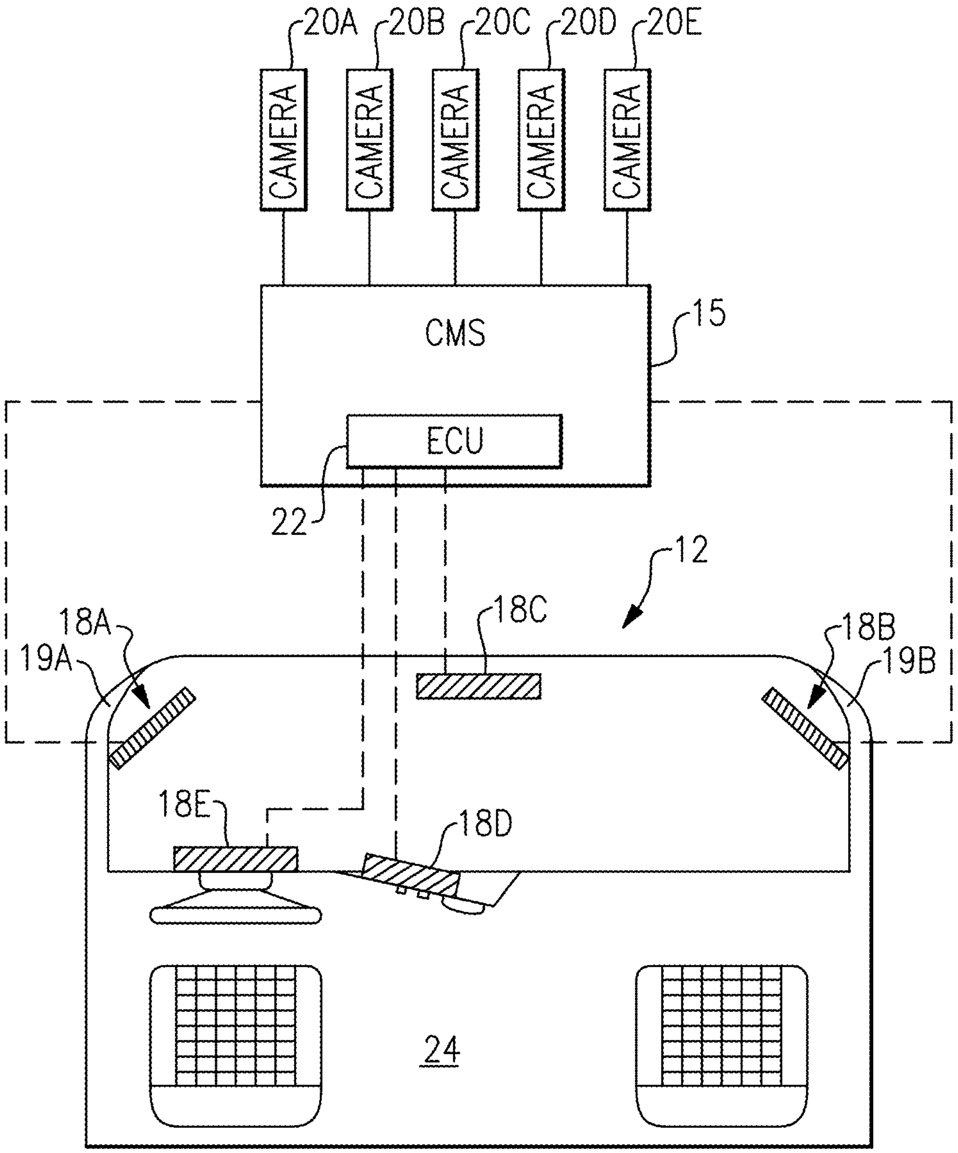
FIG. 5 is a schematic top view of an example vehicle cabin interior.
Figure 6:
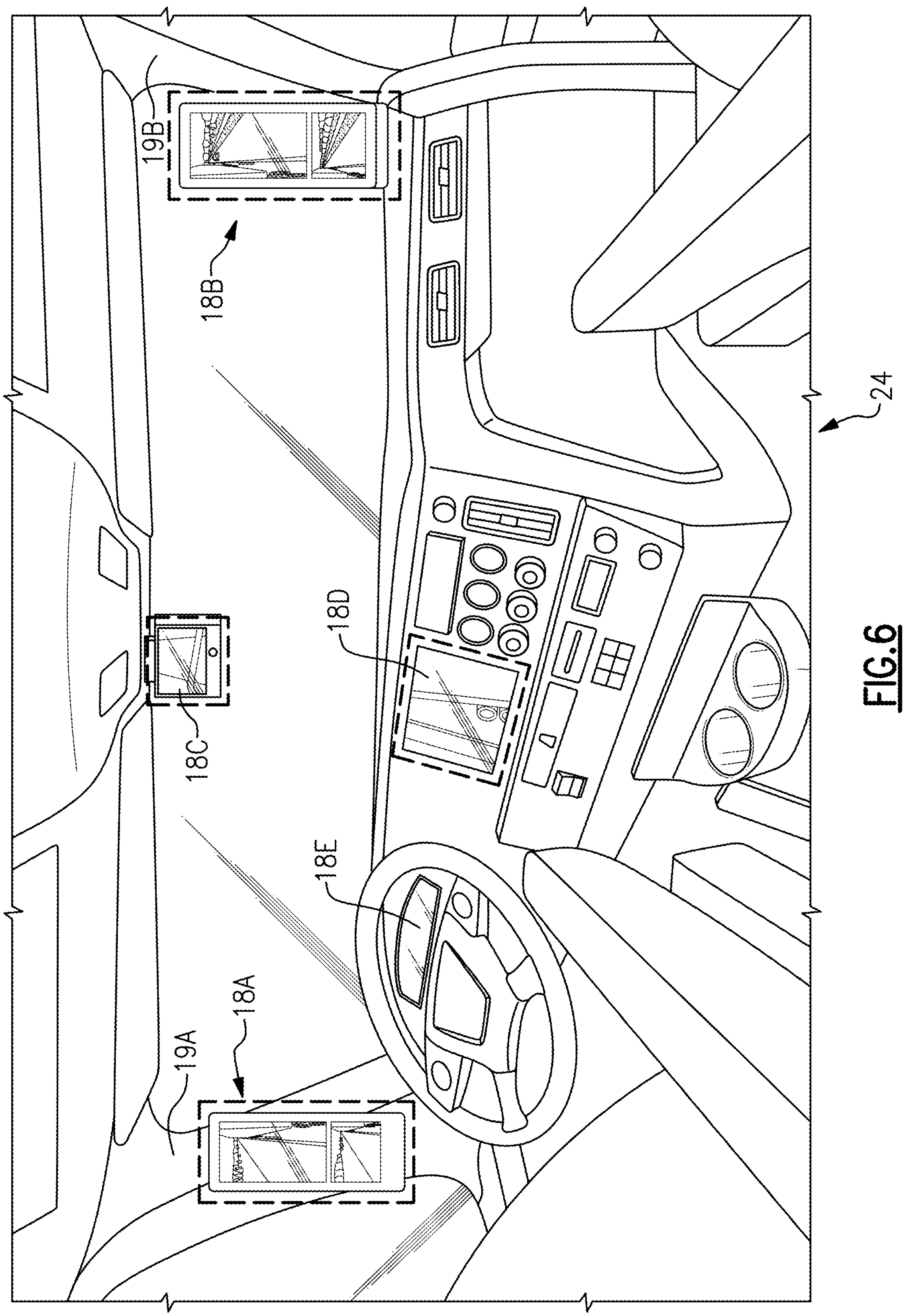
FIG. 6 is a schematic perspective view of the example vehicle cabin interior.

FIG. 5 is a schematic top view of an example vehicle cabin interior 26, and FIG. 6 is a perspective view of the vehicle cabin interior 26. Referring now to FIGS. 5-6 with continued reference to the preceding figures, electronic displays 18A-E (e.g., which may be video displays, such as LCD displays) and cameras 20A-E are shown. The various electronic displays 18A-E and cameras 20A-E are part of a camera monitor system (CMS) 15, and therefore act as CMS displays and CMS cameras. As used herein, a "CMS camera" 20 is a camera configured to record images of an environment surrounding a commercial vehicle 10, and a "CMS display" 18 is an electronic display (e.g., an LCD) that is configured to display image feeds from those cameras.

The CMS 15 includes a CMS electronic control unit (ECU) 22 that acts as a controller and includes processing circuitry that supports operation of the CMS 15. The CMS ECU 22 is operatively connected to memory (which may include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). The processing circuitry may include one or more microprocessors, microcontrollers, application specific integrated circuits (ASICs), or the like.

The CMS displays 18A-B are arranged on each of the driver and passenger sides within the vehicle cab 12 on or near the A-pillars 19A-B to display Class II and Class IV views on its respective side of the commercial vehicle 10, which provide rear facing side views along the commercial vehicle 10 that are captured by the exterior cameras 20A-B.

As discussed above, if video of Class V and Class VI views are also desired, the camera housing 16C and camera 20C may be arranged at or near the front of the commercial vehicle 10 to provide those views (FIG. 2). In the example of FIG. 3, additional displays 18C-E are provided. Display 18C is arranged in the vehicle cabin interior 26 near the top center of the windshield and may be used to display the Class V and Class VI views, which are toward the front of the commercial vehicle 10, or a backup camera view (from camera 20D or 20E) to the driver. Display 18D is provided in a center console area of the vehicle cabin interior 26, and may be used for other purposes, such as navigation, infotainment, etc. Display 18E may be part of an instrument cluster, for example. The displays 18A-E face a driver region within the vehicle cabin interior 26 where an operator is seated on a driver seat.

If desired, the camera arms 16A-B may include conventional mirrors integrated with them as well, although the CMS 15 may be used to entirely replace mirrors. In additional examples, each side can include multiple camera arms, with each arm housing one or more cameras and/or mirrors.

Figure 7A:
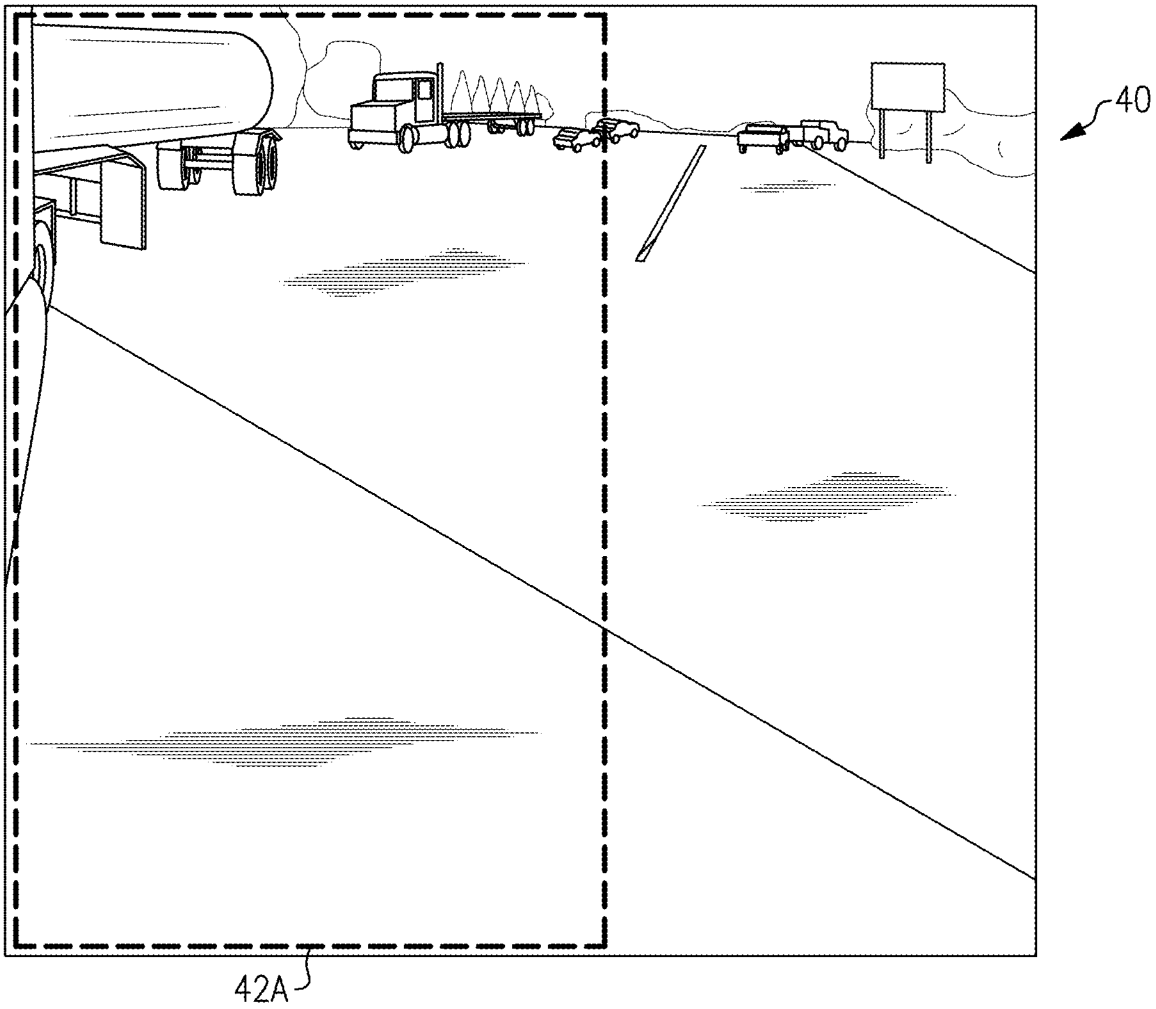
FIG. 7A is a schematic view of a first crop for an example image from a CMS.
Figure 7B:
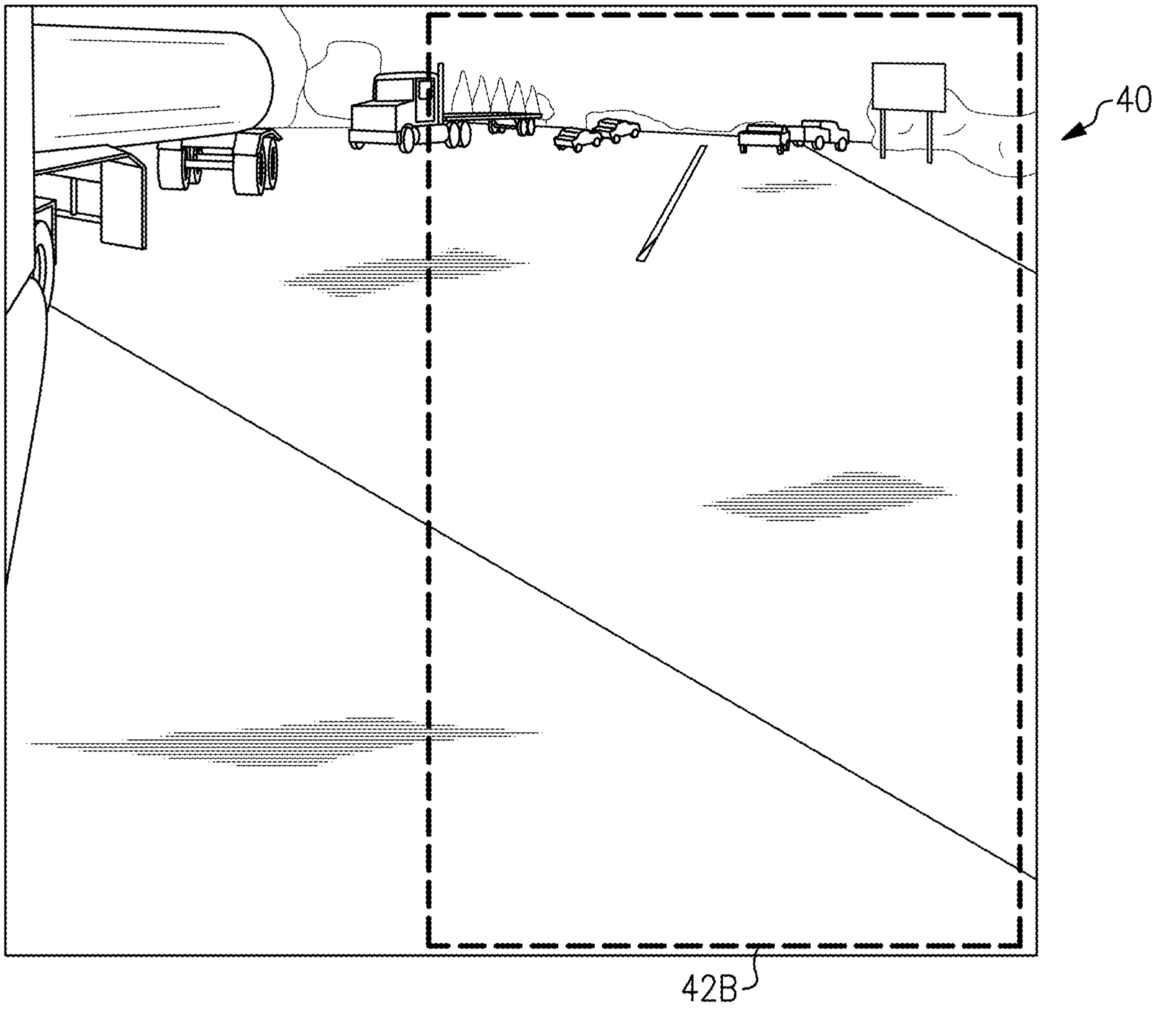
FIG. 7B a schematic view of a second crop for the example image of FIG. 7A.
Figure 7C:
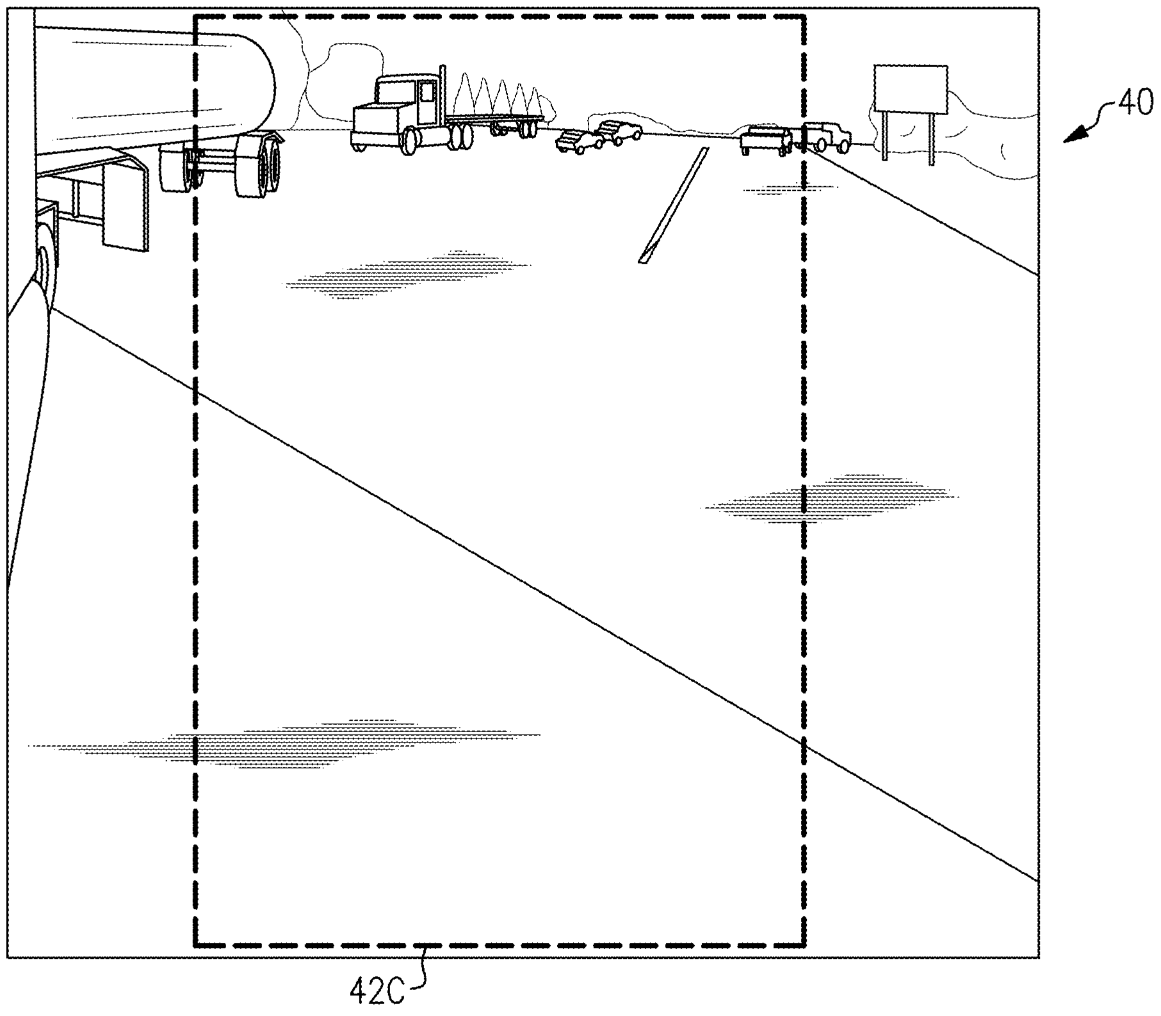
FIG. 7C a schematic view of a third crop for the example image of FIG. 7A.
Figure 8C:
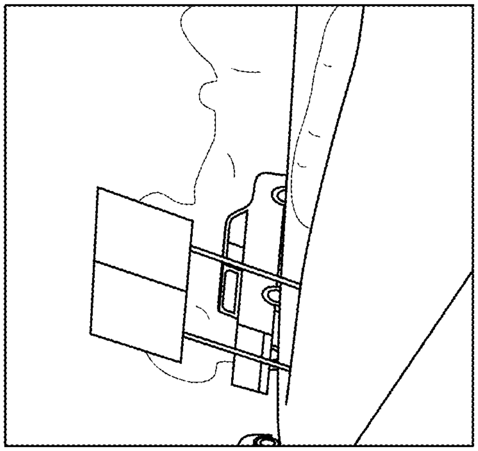
FIGS. 8A-C illustrate portions of the image of FIG. 7A before warping correction.
Figure 8B:
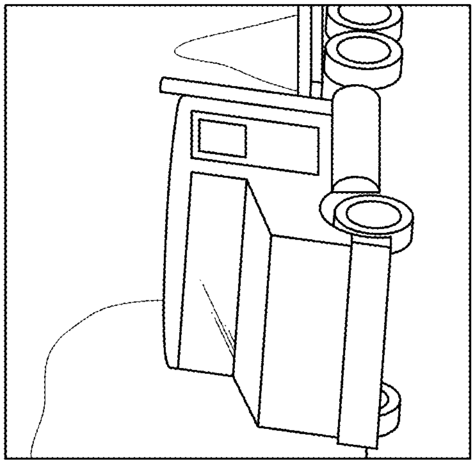
Figure 8A:
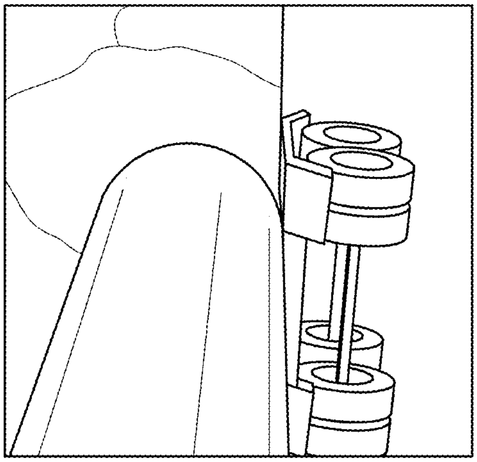
Figure 9C:
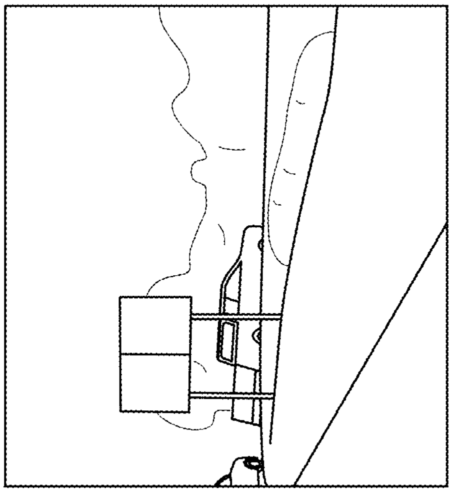
FIGS. 9A-C illustrate portions of the image of FIG. 7A after warping correction.
Figure 9B:
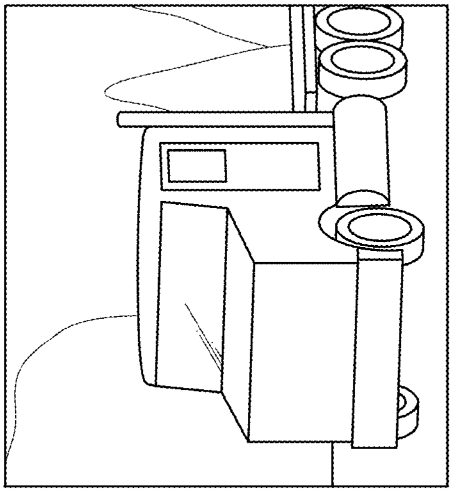
Figure 9A:
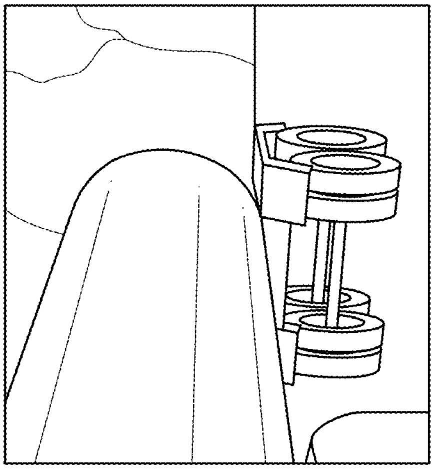

FIGS. 7A-C schematically illustrate various crops that can be applied to a larger uncropped CMS image 40 recorded by camera 20A. As discussed above, it is known to provide panning in a CMS during turns, when the trailer 14 may significantly obstruct the driver's view of the vehicle's surroundings. One known panning technique includes using a relatively wide-angle focal length for a camera 20 to record an image (see, e.g., uncropped image 40 of FIG. 7A), and then choosing different crops of the image 40 depending on factors such as the trailer angle.

Referring to FIG. 7A, when the trailer angle is zero, a left-most crop corresponding to region 42A (and a minimum panning magnitude $P_{MIN}$ which corresponds to a panning magnitude of zero) is desirable, because this enables the driver to see the edge of the trailer. However, as the trailer angle increases, it is desirable to adjust the drop so that the trailer 14 does not obstruct too much of the image. A maximum crop, corresponding to rection 42B (and a maximum panning magnitude $P_{MAX}$), is shown in FIG. 7B. An intermediate crop, corresponding to area 42C (and having a panning magnitude between $P_{MIN}$ and $P_{MAX}$) is shown in FIG. 7C. The intermediate crop 42C keeps a rear edge of the trailer 14 in view but keeps it along the left side of the image. The term "panning magnitude" refers to a degree of panning performed. This notion is applicable to both to a movable camera that pans through rotation, and a camera that pans through cropping. In the former example, panning magnitude may be measured based on a number of degrees rotation of the camera from $P_{MIN}$ to a non-zero panning position. In the latter example, the panning magnitude may be measured as a number of pixels from an edge of a non-panned image (e.g., the left side of uncropped image 40) to the same edge of non-zero panning magnitude image (e.g., area 42C in FIG. 7C).

Images 8A, 8B, and 8C correspond to various portions of the image 40A without any warping correction. As shown, the warping issue is less severe towards the left side of the uncropped image 40, but gets more severe towards the right edge of the uncropped image 40.

However, after warp correction, the images can be improved, as shown in images 9A-C.

The use of lookup tables is one possible way of determining a pixel transformation that can be performed on the cropped version of image 40 to mitigate warping. However, such tables can consume considerable amounts of memory.

Figure 10:
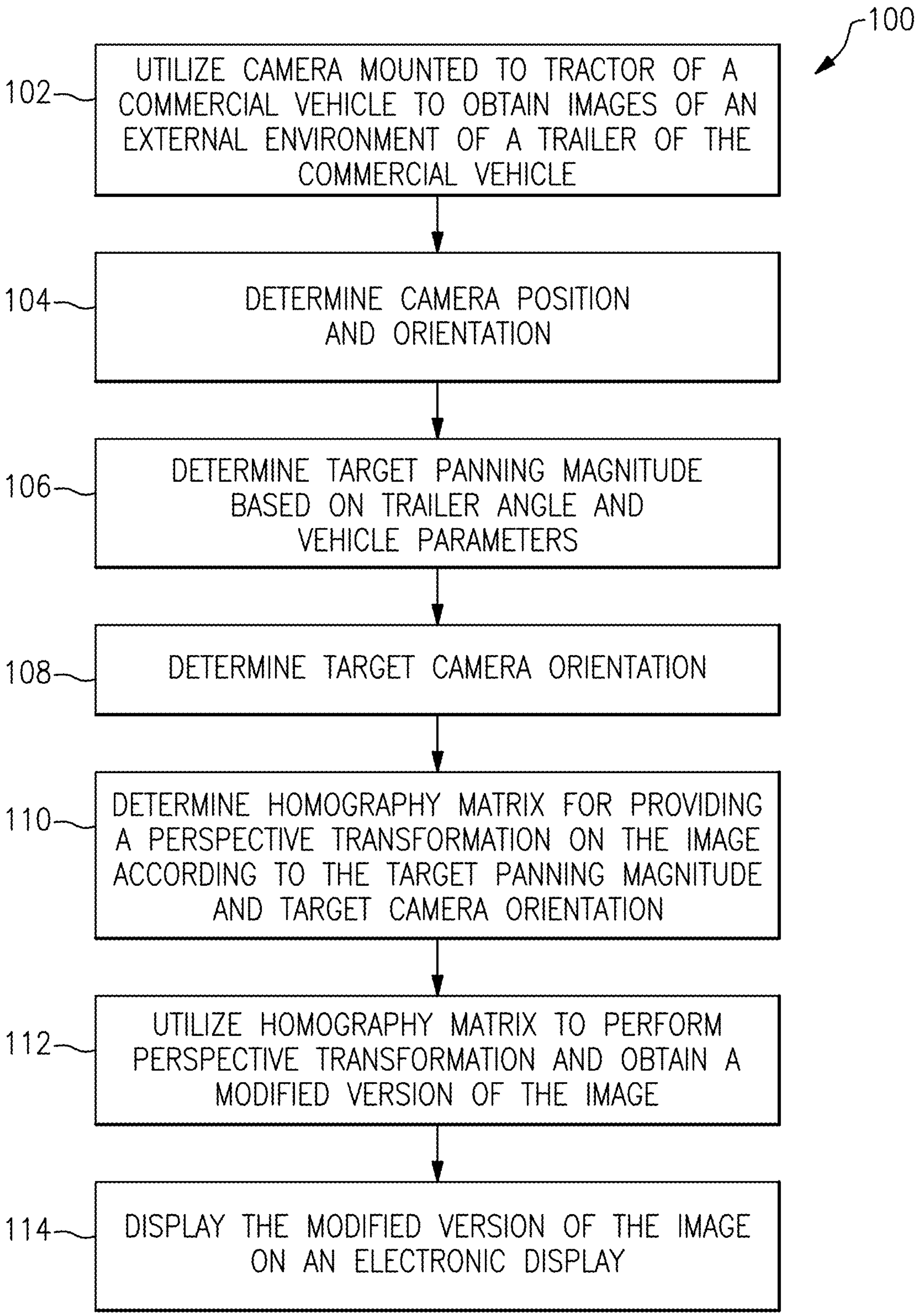
FIG. 10 is a flowchart of an example method for a CMS.

FIG. 10 is a flowchart of an example method 100 of mitigating image warping in a CMS, which uses less memory than a conventional lookup table approach. The method 100 may be performed by the ECU 22, for example.

A camera 20 mounted to a tractor 12 of a commercial vehicle 10 is used (step 102) to obtain images (e.g., image 40) of an external environment of a trailer 14 of the commercial vehicle 10, such as part of a CMS video feed.

A camera position and camera orientation are determined (step 104) for the camera 20. The camera position includes an (x, y, z) translation from a reference point associated with the vehicle 10 (e.g., corresponding to an intersection of the axes $P_{REF1}$, $Y_{REF1}$, and $R_{REF1}$ of FIG. 1D).

The camera orientation has a pitch $P_{CAM}$, roll $R_{CAM}$, and a yaw $Y_{CAM}$ of the camera 20, at least one of which are non-zero. As discussed above, the pitch $P_{CAM}$, roll $R_{CAM}$, and a yaw $Y_{CAM}$ are determined relative to a frame of reference associated with the vehicle 10 (e.g., with respect to axes $P_{REF2}$, $Y_{REF2}$, and $R_{REF2}$). In this manner, positional and orientational data of the camera 20 may be obtained.

A target panning magnitude is determined based on the trailer angle and one or more vehicle parameters (step 106). The target panning magnitude has a corresponding crop area (e.g., corresponding to crop area 42B of FIG. 7B). The target panning magnitude may be determined based on one or any combination of the following, for example:

- trailer angle of the trailer 14,
- steering angle of the vehicle 10
- one or more parameters of the vehicle 10 (e.g., vehicle 10 length and/or trailer 14 length).

One example for determining a panning magnitude is disclosed in U.S. Pat. No. 11,752,943 which calculates a panning magnitude based on dynamic conditions, and which is incorporated by reference herein in its entirety.

A target camera orientation for the camera 20 is also determined (step 108). In one or more embodiments, the target camera orientation corresponds to zero values for each of pitch $P_{CAM}$ and roll $R_{CAM}$, and with yaw $Y_{CAM}$ corresponding to the desired panning magnitude $P_{mag}$. The target orientation may be represented as a rotation matrix, for example.

A homography matrix is determined for providing a perspective transformation on cropped version of the image 40 according to the target panning magnitude $P_{mag}$ and a target camera orientation (step 110). The perspective transformation simulates adjustment (e.g., reduction) of at least one of the pitch $P_{CAM}$, yaw $Y_{CAM}$, and roll $R_{CAM}$ of the camera 20 relative to the frame of reference (e.g., the frame of reference corresponding to axes $P_{REF2}$, $Y_{REF2}$, and $R_{REF2}$). In one or more embodiments, the perspective transformation simulates adjustment (e.g., reduction) of each of the pitch, yaw, and roll of the camera 20.

In one or more embodiments, as the target panning magnitude $P_{mag}$ increases, the determining of the homography matrix in step 110 is performed to increase a magnitude of the simulated adjustment (e.g., reduction) of at least one of the pitch $P_{CAM}$, yaw $Y_{CAM}$, and roll $R_{CAM}$.

The homography matrix may be a 3×3 matrix, for example, such as the following.

$$H = \begin{bmatrix} h11 & h12 & h13 \\ h21 & h22 & h23 \\ h31 & h32 & h33 \end{bmatrix} \quad \text{equation 1}$$

The homography matrix is utilized to perform a perspective transformation and thereby obtain a modified version of the CMS image, where the perspective transformation simulates adjustment of at least one of the pitch $P_{CAM}$, yaw $Y_{CAM}$, and roll $R_{CAM}$ of the camera 20 (step 112).

The modified version of the image is displayed on an electronic display 18 (step 114).

In one or more embodiments, if the camera position and orientation are known in advance, a plurality of homography matrices for the vehicle 10 may be determined in advance as well, each corresponding to a desired panning magnitude, and then during vehicle operation determining the homography matrix in step 110 includes selecting the homography matrix from the set of predefined homography matrices.

In one or more other embodiments, the homography matrix determination in step 110 includes dynamically determining the homography matrix based on current vehicle conditions.

An example application of the method is described below.

In step 110, the target camera orientation for the camera 20 may be represented by the rotation matrix R2 shown below. In this example, the target camera orientation corresponds to zero values for each of pitch $P_{CAM}$ and roll $R_{CAM}$, and with yaw $Y_{CAM}$ corresponding to the desired panning magnitude $P_{mag}$. Of course, it is understood that other values could be used.

$$R2 = (Pmag, 0, 0) \quad \text{equation 2}$$

where $P_{mag}$ represents the target panning magnitude (which may correspond to a panning angle, for example, and may be added to the yaw axis $Y_{REF2}$ of the camera 20).

In one or more embodiments, the homography matrix can be calculated using this formula:

$$H = K2 \cdot R2 \cdot R1^{-1} \cdot K^{-1} \quad \text{equation 3}$$

where: K1 is an intrinsic matrix of the original physical camera 20, which contains physical properties such as focal length and offsets to principal points;

K2 is an intrinsic matrix of a Class II pseudo camera era (the focal length and offsets to the principle points of K2 can be calibrated for proper zoom-in effect, so it does not have to be same as K1, and the purpose of this design is provide a better vison for the driver); and R1 is a rotation matrix representing an initial orientation of the camera 20.

Below, P1 represents the data of a given pixel prior to performing the method 100, and P2 represents the pixel data after perspective transformation with the homography matrix.

$$P1 = (u1, v1, 1)^T \quad \text{equation 4}$$

-continued $$P2 = (u2, v2, 1)^T \quad \text{equation 5}$$

$$P2 = H \cdot P1 \quad \text{equation 6}$$

In one or more embodiments, P2 is normalized to find the final pixel coordinates using equations 7-8 below.

$$u2 = (h11 \cdot u1 + h12 \cdot v1 + h13)/(h31 \cdot u1 + h32 \cdot v1 + h33) \quad \text{equation 7}$$

$$v2 = (h21 \cdot u1 + h22 \cdot v1 + h23)/(h31 \cdot u1 + h32 \cdot v1 + h33) \quad \text{equation 8}$$

where u1 and u2 represent X and Y pixel coordinates.

The entire image cropped or image may be mapped using the MATLAB function imwarp, which takes the input image and a transformation object projective2d(H'), where H' is a transposed version of the homography matrix. The imwarp function applies the transformation to each pixel (e.g., for a particular crop), effectively mapping the entire image from the old camera orientation/perspective to the new, desired camera orientation/perspective.

This function applies the homography transformation to each pixel in the image. Example syntax for imwarp is provided below:

outputimage=imwarp (inputImage, projective2d(H'));

Inputs:

inputImage: the raw image captured from the actual camera.

projective2d(H'): the homography matrix converted to a projective transformation object.

Outputs:

outputImage: The image transformed to match the virtual camera view.

Although example embodiments have been disclosed, a worker of ordinary skill in this art would recognize that certain modifications would come within the scope of the claims. For that reason, the following claims should be studied to determine their true scope and content.

What is claimed is:

1. A method for a camera monitor system (CMS), comprising:

utilizing a camera mounted to tractor of a commercial vehicle to obtain an image of an external environment of a trailer of the commercial vehicle;

determining a homography matrix for providing a perspective transformation of the image according to a target panning magnitude for the commercial vehicle and according to a target orientation adjustment for the camera;

utilizing the homography matrix to perform the perspective transformation and thereby obtain a modified version of the image, wherein the perspective transformation simulates adjustment of at least one of a pitch, yaw, and roll of the camera; and displaying the modified version of the image on an electronic display.

2. The method of claim 1, comprising:

determining a location of the camera relative to a reference point associated with the commercial vehicle; and determining the yaw, pitch, and roll of the camera relative to a frame of reference associated with the commercial vehicle;

wherein the perspective transformation simulates reduction of at least one of the yaw, pitch, and roll of the camera relative to the frame of reference.

3. The method of claim 2, wherein as the target panning magnitude increases, said determining the homography matrix is performed to increase a magnitude of the simulated adjustment of said at least one of the yaw, pitch, and roll.

4. The method of claim 1, wherein the perspective transformation simulates adjustment of the pitch of the camera.

5. The method of claim 1, wherein the perspective transformation simulates adjustment of the yaw of the camera, and includes adding the target panning magnitude to a yaw axis of the camera.

6. The method of claim 1, wherein the perspective transformation simulates adjustment of the roll of the camera.

7. The method of claim 1, wherein the perspective transformation simulates adjustment of the pitch, yaw, and roll of the camera.

8. The method of claim 1, wherein said determining the homography matrix comprises dynamically determining the homography matrix.

9. The method of claim 1, wherein said determining the homography matrix comprises selecting the homography matrix from a set of predefined homography matrices.

10. The method of claim 1, comprising:

determining the target panning magnitude based on a trailer angle of the trailer, and based on one or more parameters of the commercial vehicle.

11. A camera monitor system (CMS), comprising:

a camera mounted to tractor of a commercial vehicle and configured to obtain an image of an external environment of a trailer of the commercial vehicle; and processing circuitry operatively connected to memory and configured to:

determine a homography matrix for providing a perspective transformation of the image according to a target panning magnitude for the commercial vehicle and a according to target orientation adjustment for the camera;

utilize the homography matrix to perform the perspective transformation and thereby obtain a modified version of the image, wherein the perspective transformation simulates adjustment of at least one of a pitch, yaw, and roll of the camera; and display the modified version of the image on an electronic display.

12. The CMS of claim 11, wherein the processing circuitry is configured to:

determine a location of the camera relative to a reference point associated with the commercial vehicle; and determine the yaw, pitch, and roll of the camera relative to a frame of reference associated with the commercial vehicle;

wherein the perspective transformation simulates reduction of at least one of the yaw, pitch, and roll of the camera relative to the frame of reference.

13. The CMS of claim 12, wherein the processing circuitry is configured to, as the target panning magnitude increases, determine the homography matrix to increase a magnitude of the simulated adjustment of said at least one of the yaw, pitch, and roll.

14. The CMS of claim 11, wherein the perspective transformation simulates adjustment of the pitch of the camera.

15. The CMS of claim 11, wherein the perspective transformation simulates adjustment of the yaw of the camera, and includes addition of the target panning magnitude to a yaw axis of the camera.

16. The CMS of claim 11, wherein the perspective transformation simulates adjustment of the roll of the camera.

17. The CMS of claim 11, wherein the perspective transformation simulates adjustment of the pitch, yaw, and roll of the camera.

18. The CMS of claim 11, wherein the processing circuitry is configured to dynamically determine the homography matrix.

19. The CMS of claim 11, wherein the processing circuitry is configured to select the homography matrix from a set of predefined homography matrices.

20. The CMS of claim 11, wherein the processing circuitry is configured to:

determine the target panning magnitude based on a trailer angle of the trailer, and based on one or more parameters of the commercial vehicle.

* * * * *